J. R. PEIRCE.
PERFORATED CARD FOR ACCOUNTING SYSTEMS.
APPLICATION FILED AUG. 16, 1912.
1,236,475.
Patented Aug. 14, 1917.
3 SHEETS—SHEET 1.
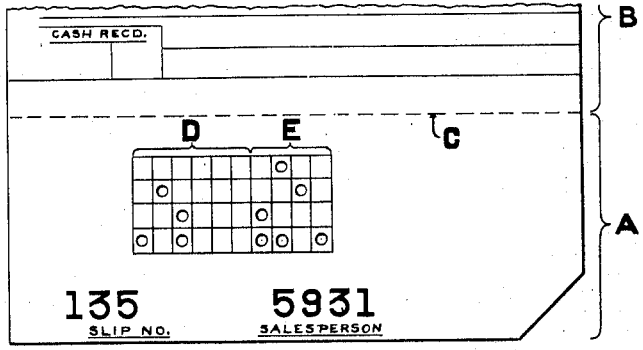
FIG 1
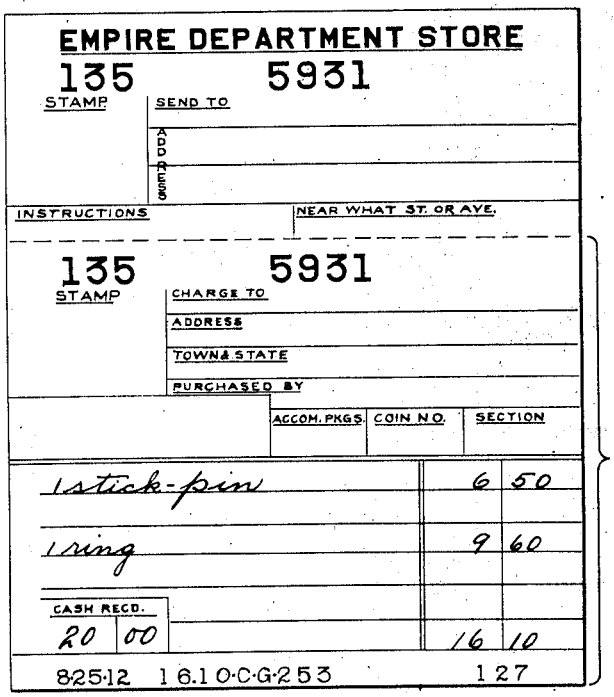
FIG 2
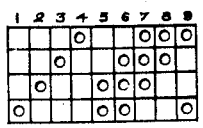
FIG. 3.
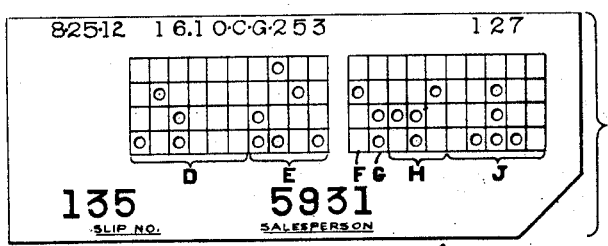
WITNESSES
Harold Wieland
William K. Seewagen
INVENTOR
John Royden Peirce,
BY D. Anthony Usina, ATTORNEY J. R. PEIRCE.
PERFORATED CARD FOR ACCOUNTING SYSTEMS.
APPLICATION FILED AUG. 16, 1912.

1,236,475.

Patented Aug. 14, 1917.
3 SHEETS—SHEET 2.

J. R. PEIRCE.
PERFORATED CARD FOR ACCOUNTING SYSTEMS.
APPLICATION FILED AUG. 16, 1912.

1,236,475.

Patented Aug. 14, 1917.
3 SHEETS—SHEET 3.

| AUTHORIZATION | EMPIRE DEPARTMENT STORE | | |
|---|---|---|---|
| | DEPT. NO. 253 | SLIP NO. 135 | SALESPERSON 5931 |
| SEND TO | | | |
| PLACE | | | |
| CARE OF | | | |
| SHIPPING INSTRUCTIONS | | | |
| DATE | HOW SENT | LABOR | AMT. OF SALE 16 10 |
| CHARGE TO | | | |
| ADDRESS | | | |
| TOWN AND STATE | | | |
| PURCHASED BY | | | |
| 1 stick-pin | | | 6 50 |
| 1 ring | | | 9 60 |
| | | | |
| DEPT. NO. 253 | | | 16 10 |
| | | DEPT. NO. | COIN NO. |
| SLIP NO. 135 | | ACCOM. | O.K. | AUTHORIZATION |
| SALESPERSON 5931 | | CASH FROM CUSTOMER 20 00 | |
| DEPT. NO. 253 | | DATE 8-25-12 | LABOR |
| SLIP NO. 135 | | | |
| SALESPERSON 5931 | | CASH FROM CUSTMR 20 00 | AMT. OF SALE 16 10 |

WITNESSES

INVENTOR
John Royden Peirce,
BY Anthony Usina, ATTORNEY

UNITED STATES PATENT OFFICE.

JOHN ROYDEN PEIRCE, OF NEW YORK, N. Y.

PERFORATED CARD FOR ACCOUNTING SYSTEMS.

1,236,475.  Specification of Letters Patent.  Patented Aug. 14, 1917.

Application filed August 16, 1912. Serial No. 715,409.

*To all whom it may concern:*

Be it known that I, JOHN ROYDEN PEIRCE, a citizen of the United States, residing in the city, county, and State of New York, have invented certain new and useful Improvements in Perforated Cards for Accounting Systems, of which the following is a specification.

In large department stores and similar institutions it is customary for the salesperson to make out a slip for each sale, showing the items, that is the kind and amount of goods purchased, the price and other information concerning the particular transaction; said sales slip containing also certain "class" information, common to a number of transactions, such as the department number, the salesperson's number, and so forth. A duplicate of the sales slip is made out simultaneously, by means of a sheet of carbon paper. In the case of cash sales the original slips go to the customer, (the salesperson merely retaining a memorandum of the total amounts), and the duplicates go to the accounting office for the purpose of auditing the accounts of cash turned in by the salesperson. In the case of a credit sale the original slips go to the cashier, and the duplicates are used for auditing or checking the same. Many variants of the system and of the style of slips are used in different businesses; but in practically all cases the slips contain printed class information common to a number of transactions and the salesperson writes on it information concerning a particular transaction, and in most systems the slips belonging to each salesperson are printed beforehand with consecutive numbers which identify the separate transactions.

My present invention provides a card, or so called "slip", which can be readily substituted for the slips heretofore in use, or used in addition thereto, and which is of minimum size and which is perforated in such a way as to permit a quick and accurate auditing of the accounts and a distribution of the amounts into the classes desired, all by the use of said cards in accounting and distributing mechanism described in previous applications for patent which I have filed (as, for example, No. 479,189 filed February 20, 1909, and 601,817 filed January 10, 1911). The perforating of the cards may be effected in various types of machine, as for example in that described in my application for patent, No. 480,052, February 25, 1909. Besides the uses of the card above described, it has certain features of advantage which are useful in other fields of accounting, cost keeping and distributing or classifying and tabulating information of various sorts.

The accompanying drawings illustrate certain embodiments of the invention.

Figure 1 illustrates the audit portion of the card before use.

Fig. 2 illustrates the complete card after use with the audit portion separated from the sales slip portion.

Fig. 5 shows a sales slip which is used with the card of Fig. 3.

Fig. 6 is a chart of the system of perforations.

Figure 3:
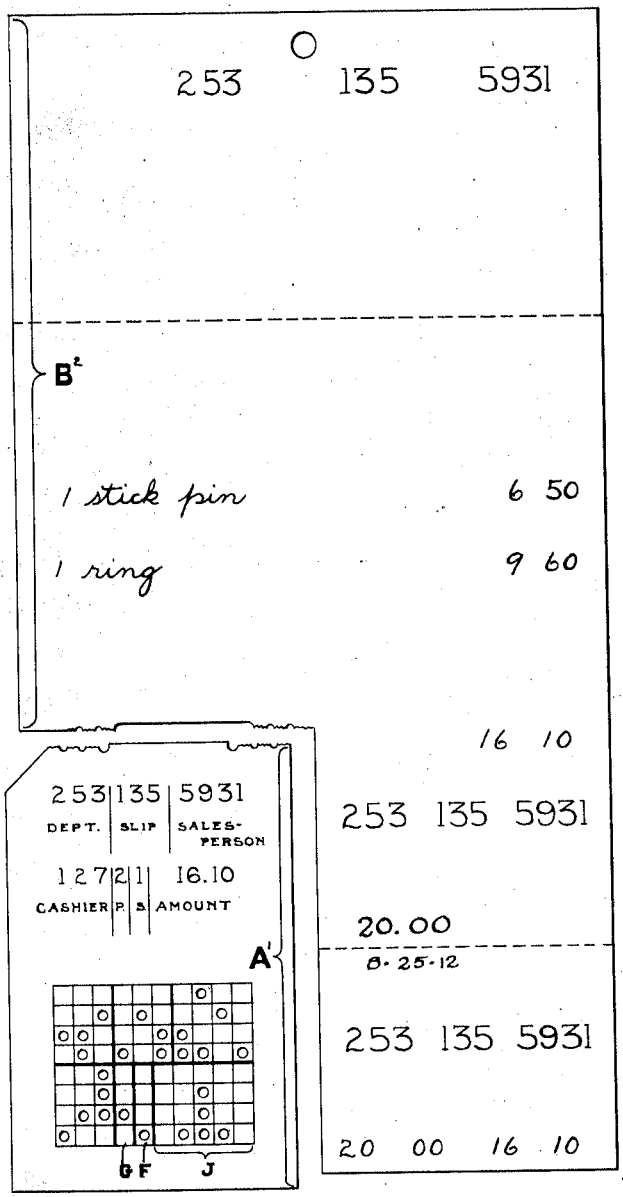
Fig. 3 shows another style of card after use with the audit portion separated.

Referring now to the embodiments of the invention illustrated, Fig. 1 shows before use an audit portion of a card, A, and part of a sales slip portion, B, of the card which is shown complete after use, in Fig. 2, a weakened tearing line C being provided for separating them. This audit portion is provided beforehand with a class number (No. 5,931) indicating the salesperson and an individual number (No. 135) indicating the particular transaction; and with a group of perforations D corresponding to the slip number and a group E corresponding to the salesperson's number. The sales slip portion B of the card is similarly printed, but is not perforated. A certain corner of each card is cut off as indicated to enable the user to quickly stack them or insert them into a machine in proper position.

When a sale is made the salesperson writes the items, the prices and the total on the sales slip portion (and in some cases other information which is not pertinent here) and hands it to the cashier, who puts it in a suitable machine and prints and punches it as hereinafter described and separates the audit portion. The two parts are then sent through the usual channels to the accounting department.

For example in Fig. 2 the sales slip portion B has written on it the goods bought, the prices and the total, $16.10. The cashier's machine prints on both the sales slip portion and the audit portion the date (8—25—12); the total amount ($16.10); the number or symbol indicating the kind of sale as a cash or credit, or according to any desired classification indicated by a number or letter (C); and the kind of person as local, out of town, or the like (G); the department (253); and the cashier's number (127). These items are all "class" items except the amount which is an individual item. The machine at the same time perforates the card to correspond with the individual item and such of the class items as are desired. In Fig. 2 the kind of sale is indicated in the column marked F; the kind of person in the column marked G; the department in the column marked H; and the total amount in the column marked J; the date and the cashier's number being omitted. These perforations are made only in the audit portion of the card. The audit portion then contains printed repetitions of some of the class items on the sales slip portion, printed and perforated repetitions of other class items on the sales slip portion and printed and perforated repetitions of individual items on the sales slip portion. The audit portion of the card thus has printed and perforated on it before use at least one of the class items and one of the individual items (the salesperson's number and the slip number respectively) corresponding to the same items on the sales slip portion; and has after use printed and perforated thereon one or more class items and individual items corresponding to similar items on the sales slip portion; and has also after use printed, but not perforated, class items such as the date and the cashier's number, corresponding to the same items on the sales slip portion.

In the drawings vertical and horizontal lines are drawn to show the spaces in which the holes or perforations are located. In practice, however, these lines may be omitted. It is not necessary to read the perforations, the machine being certain to print the numbers corresponding exactly with the perforations so that they may be readily read by the operator. The distributing machine in which the audit portion of the card is afterward introduced, and which is controlled by such audit portion of the card, of course does not require the lines indicating the spacing of the holes. A feature of particular advantage in cards for this and for various other businesses is the use of less than nine spaces for indicating the several digits from one to nine, (zero being indicated by the absence of a perforation). As illustrated, each vertical column contains one or more perforations indicating the corresponding digit, and in each column there are four spaces, the several digits being indicated by one or more perforations in various combinations of spaces. For example, referring to Figs. 1 and 2 the slip number 135 is represented by the perforations in the first, second and third columns of the hole-spaces under D; a perforation in the lowermost or first space of the first column corresponding to the digit 1; a perforation in the third space of the second column corresponding to the digit 3; two perforations, one in the first and one in the second space, in the third column corresponding to the number 5. Fig. 6 indicates a complete system of different perforations or groups of perforations corresponding to the numbers from 1 to 9. In previous systems it has been common to use a single perforation for each digit, in which case nine different spaces are necessary in each column in order to compass the nine digits. Using four hole-spaces and using either one or more perforations in each column it is apparent that any one of the nine digits can be represented by suitably varying the positions of the perforations and the number of the perforations in the column. Where letters or other characters are used instead of numerals, as the letters (C) and (G) in the lower part of Fig. 2 the four hole-spaces in the corresponding columns F and G are sufficient to compass a series consisting of not more than sixteen characters, since this is the greatest number of combinations of none, one, two, three or four holes which can be made in the four hole-spaces of a column. For example in Fig. 2, column F the letter C is represented by a perforation in the third space; and in column G the letter is represented by perforations in the first and second spaces. This combination system of perforations permits of the use of a very small card and small and comparatively simple machines for perforating the card and for using the same. The economy in fact is so great as to make the system applicable to many businesses in which it would not otherwise be practical.

With such a card the auditing of the accounts is greatly facilitated. If the totals shown by the distributing machine through which the audit portion of the card is passed do not correspond with the totals obtained from the sales slips or with the total of cash turned in by the salesperson, the error can be readily located by comparing, for any particular class of items, all the sales slips with all the audit portions, the class numbers repeated on the two portions of the card making it easy to effect this comparison; and the printing of the amount on both portions of the card serving as a check one portion against the other. Or in the case shown in Fig. 2 the amount written by the sales person, $16.10, may be compared with the amount printed on the same portion of the card, with which of course it should correspond.

Figure 4:
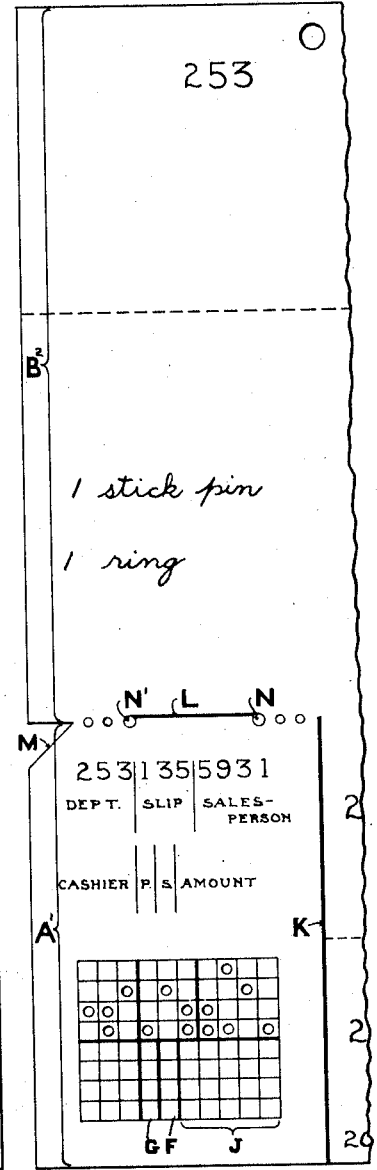
Fig. 4 is a fragment of Fig. 3 before use.

The term "card" is used herein to include light card-board and any similar material and to cover a single sheet which is intended to be torn or cut or otherwise separated into two or more parts, as in Figs. 1 and 2; and is used also to include a combination of two or more sheets adapted to be used together for a single transaction, the audit portion being in the beginning on a separate piece of paper or a detachable portion of such separate piece. Such a case is shown in Figs. 3, 4 and 5, in which the original sales slip B', Fig. 5, is laid over the card of Fig. 3, with a sheet of carbon paper between; the card of Fig. 3 comprising the audit portion A' and the duplicate sales slip portion B². The salesperson's number and department number, which are class items, are printed on the original and duplicate sales slip portions and are also printed and perforated on the audit portion; and the same is true of the individual item, the slip number; this being shown on the fragment, Fig. 4.

After the salesperson has entered the items and the amount on the original and duplicate sales slip portions, the original is separated from the duplicate and handed to the buyer of the goods or otherwise disposed of. The duplicate with the audit portion attached is handed to the cashier who tears off the audit portion and introduces it into the perforating and printing machine and perforates and prints such class items and individual items as are desired. According to Fig. 3 there is added to the audit portion of the card in this operation the printed indication of the cashier's number, the printed and perforated indication of the kind of person (indicated at P and in the column G) and the printed and perforated indication of the kind of sale, indicated at S and in the column F; and the printed and perforated amount, (shown in column J). This differs from the method illustrated in Figs. 1 and 2 in that the card of Fig. 3 has an additional class item, "department" printed and perforated before use. Also the class items which are printed and perforated on the audit portion after use are not repeated on the sales slips; and the individual item, the amount, though printed on the audit portion is not printed on the sales slips, being indicated there in the sales person's handwriting.

In Figs. 3 and 4 there is illustrated a peculiar style of card which may be adopted for the one piece card of Figs. 1 and 2 or may be used in connection with the extra sales slip shown in Fig. 5. In this style of card the audit portion is integral with the remainder of the card, so as to facilitate its use in connection therewith but is located in one corner of the complete card so as to secure a convenient and compact shape; and a line of cuts and perforations is provided around the audit portion whereby when the latter is torn away from the remainder of the card it is of a shape which is specially convenient and useful in passing it through subsequent sorting or distributing machines. It is important in feeding such cards rapidly through a sorting or a distributing machine that the edges of the card shall be clean and sharp, and not ragged or thick like the edge which commonly results from tearing a card along a perforated line. This result is secured in the construction in Figs. 3 and 4 by partly cutting the audit portion A' from the duplicate slip B², leaving only a small connecting portion which is perforated. The outer side edge and the lower edge correspond with the edges of the complete card. The inner side edge of the audit portion is separated by a clean cut K from the remainder. The central part of the upper edge of the audit portion is separated by a similar clean cut L from the remainder of the card. A beveled corner M is provided for determining the correct position of the audit portion of the card in the machine. Between the ends of the cut L and the adjacent edges perforations N are provided by which the audit portion can be quickly torn off. The cut L is above the perforations N, being extended between two larger perforations N', so that in the detached audit portion of the card the clean cut edge will stand above the slightly ragged edge made by tearing through the perforations. This card is fed through the machine by means of a pusher bearing upon its upper edge and it is important that at least the portion of the upper edge upon which the pusher bears be cleanly cut; and it is of advantage that this clean cut portion be above the ragged marginal portions.

What I claim is:

1. A card of the character described comprising two portions, the first portion thereof bearing certain class information common to a number of transactions, said first portion bearing printed matter and constituting a sales slip and being provided with appropriately indicated spaces adapted to have the information concerning a particular transaction written therein by a salesperson, the second portion thereof constituting an audit card having delimited hole spaces which when perforated in a determined relation indicate the class and certain particular items of information, said audit portion being also detachable and used to control classifying and accounting mechanism.

2. A card of the character described comprising two portions, a first portion having designated thereon certain class information common to a number of transactions and a second portion, said first portion bearing printed matter and constituting a sales slip provided with appropriately indicated spaces adapted to have the information concerning a particular transaction written thereon by a salesperson, and said second portion constituting an audit card having printing spaces and having delimited hole spaces which, when perforated in a determined relation, indicate the class and certain particular items of information, said audit portion being also detachable and used to control classifying and accounting mechanism.

3. A card of the character described comprising two portions, one portion having designated thereon certain class information common to a number of transactions and a second portion having the same information printed and perforated thereon by means of perforations in certain delimited hole spaces, said first portion constituting a sales slip having a space upon which the information concerning a particular transaction may be written by a salesperson, and said second portion constituting an audit card which is detachable and used to control classifying and accounting mechanism.

4. A card of the character described comprising two portions, one portion having designated thereon certain class information common to a number of transactions and also certain information distinguishing each card from the others, and a second portion having the same information printed and perforated thereon by means of perforations in certain delimited hole spaces, said first portion constituting a sales slip having a space upon which the information concerning a particular transaction may be written by a salesperson, and said second portion constituting an audit card which is detachable and used to control classifying and accounting mechanism.

5. A card of the character described having certain numbers indicated thereon by perforations, said card having for each digit of the number a group of less than nine delimited hole spaces and the digits of the number being represented by various combinations of perforations in said spaces, and said number being represented by a group of combinations of perforations.

6. A card of the character described having certain numbers indicated thereon by perforations, said card having for each digit of the number a group of four hole spaces and the digits of the number being represented by various combinations of perforations in said spaces, and said number being represented by a group of combinations of perforations.

7. A card of the character described having two portions integrally attached to each other and separable along a determined line consisting partly of a weakened line and partly of a straight cut, said straight cut being offset from said weakened line.

In witness whereof I have hereunto signed my name in the presence of two subscribing witnesses.

JOHN ROYDEN PEIRCE.

Witnesses:
 JACOB ARNREIM, Jr.,
 ARTHUR PENTECOST.